(12) United States Patent
Alasti et al.

(10) Patent No.: US 11,910,411 B2
(45) Date of Patent: *Feb. 20, 2024

(54) PREDICTION-BASED NON-TERRESTRIAL NETWORK SATELLITE BEAM CONFIGURATION AND SWITCHING

(71) Applicant: DISH Wireless L.L.C., Englewood, CO (US)

(72) Inventors: Mehdi Alasti, Reston, VA (US); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/468,373

(22) Filed: Sep. 7, 2021

(65) Prior Publication Data

US 2023/0070326 A1 Mar. 9, 2023

(51) Int. Cl.
*H04W 72/51* (2023.01)
*H04W 72/23* (2023.01)
(Continued)

(52) U.S. Cl.
CPC ........... *H04W 72/51* (2023.01); *H04W 4/021* (2013.01); *H04W 72/0453* (2013.01); *H04W 72/23* (2023.01)

(58) Field of Classification Search
None
See application file for complete search history.

(56) References Cited

U.S. PATENT DOCUMENTS

2020/0052782 A1* 2/2020 Wang .................... H04W 76/27
2020/0313819 A1* 10/2020 Zhou .................... H04L 5/0048
(Continued)

FOREIGN PATENT DOCUMENTS

WO 2020/033675 A1 2/2020
WO 2021/026682 A1 2/2021

OTHER PUBLICATIONS

Asia Pacific Telecom, "Discussion on physical layer control procedures for NTN," in *3GPP TSG-RAN WG1 Meeting #98, R1-1908934, Agenda item 7.2.5.2*, Prague, Czech Republic, Aug. 26-30, 2019, 6 pages.

(Continued)

*Primary Examiner* — Srinivasa R Reddivalam
(74) *Attorney, Agent, or Firm* — Seed IP Law Group LLP

(57) ABSTRACT

A method and apparatus for prediction-based non-terrestrial network beam configuration and switching are provided. A base station determines a bandwidth part configuration for a user equipment, which includes a plurality of bandwidth parts respectively corresponding to a plurality of geographic areas. The base station configures the user equipment with the bandwidth part configuration and determines a position or movement of the user equipment in a first geographic area corresponding to a first bandwidth part. The base station determines, based on the position or movement, whether a criterion for reconfiguring the bandwidth part configuration is met. In response to determining that the criterion is met, the base station reconfigures the bandwidth part configuration of the user equipment while the user equipment is positioned in the first geographic area. The reconfiguration includes modifying the plurality of bandwidth parts to include a second bandwidth part corresponding to a second geographic area.

20 Claims, 8 Drawing Sheets

(51) Int. Cl.
   *H04W 4/021* (2018.01)
   *H04W 72/0453* (2023.01)

(56) References Cited

U.S. PATENT DOCUMENTS

| | | | |
|---|---|---|---|
| 2021/0058145 A1 | 2/2021 | Alasti et al. | |
| 2021/0058940 A1 | 2/2021 | Choi et al. | |
| 2021/0227442 A1 | 7/2021 | Yiu | |
| 2022/0078799 A1* | 3/2022 | Chande | H04W 72/541 |

OTHER PUBLICATIONS

Asia Pacific Telecom, MTI, "Physical layer control procedures," in *3GPP TSG-RAN WG1 Meeting #97. R1-1907357. Agenda item 7.2.5.2*, Reno, USA, May 13-17, 2019, 4 pages.

CATT, CAICT, "Further discussion on physical layer control procedures," in *3GPP TSG RAN WG1 Meeting #98, R1-1908590*, Prague, Czech Republic, Aug. 26-30, 2019, 4 pages.

CMCC, "Considerations on mobility for GEO," in *3GPP TSG-RAN WG2 Meeting #107, R2-1909439 Revision of R2-1905932*, Prague, Czech Republic, Aug. 26-30, 2019, 4 pages.

Evans et al., "5G Terrestrial and Satellite," in *Satellites for 5G Colloquium, 2018 Ka band satellite conference*, University of Surrey-5G Innovation Centre, Niagara Falls, Canada, Oct. 2018, 24 pages.

Guidotti et al., "Architectures and Key Technical Challenges for 5G Systems Incorporating Satellites," *IEEE arXiv: 1806.02088v1 [cs. NI]*, Jun. 6, 2018, 18 pages.

International Search Report and Written Opinion for Application No. PCT/US2020/046980, dated Nov. 23, 2020, 17 pages.

Kuchi, Kiran, "5G NTN," International Institute of Technology Hyderabad, 6 pages.

Saarnisaari, Harri, "Integration of 5G and Satcom," in *6G Wireless Symposium, IEEE 5G Summit*, Levi, Florida, Mar. 24-26, 2019, 10 pages.

Watts et al., "Use cases to business modelling of satellite backhaul in 5G," in *36th International Communications Satellite Systems Conference (ICSSC 2018)*, Niagara Falls, Canada, Oct. 15-18, 7 pages.

Huawei, HiSilicon, "Discussion on other design aspects for NTN," R1-2105529, Agenda Item: 8.4.4, 3GPP TSG RAN WG1 Meeting #105-e, E-meeting, May 10-27, 2021, 7 pages.

International Search Report, dated Dec. 9, 2022, for International Application No. PCT/US2022/042647, 16 pages.

* cited by examiner

PREDICTION-BASED NON-TERRESTRIAL NETWORK SATELLITE BEAM CONFIGURATION AND SWITCHING

BACKGROUND

Technical Field

This application is directed to prediction-based non-terrestrial network beam configuration and switching and, in particular, reconfiguration of satellite beams and bandwidth parts of a user equipment based on predicting a repositioning of a user equipment to a different geographic area.

Description of the Related Art

Non-terrestrial communication networks are characterized by using an Earth-orbiting satellite as a base station that communicates with an earthbound user equipment. In non-terrestrial communication networks, as well as other communication networks, time and frequency resources that are available for use in uplink and downlink channels are limited. Due to the need for ever-increasing communication data rates, it is particularly important to utilize the diversity gain to meet data rate demands.

BRIEF SUMMARY

In an embodiment, a non-terrestrial network entity includes a controller configured to determine a bandwidth part configuration for a user equipment, where the bandwidth part configuration includes a plurality of bandwidth parts respectively corresponding to a plurality of geographic areas. In an embodiment, the controller causes the user equipment to be configured with the bandwidth part configuration and determines a position or movement of the user equipment in a first geographic area of the plurality of geographic areas, where the first geographic area corresponds to a first bandwidth part of the plurality of bandwidth parts. In an embodiment, the controller determines, based on the position or movement of the user equipment in the first geographic area, whether at least one criterion for reconfiguring the bandwidth part configuration is met and in response to determining that the at least one criterion for reconfiguring the bandwidth part configuration is met, reconfigures the bandwidth part configuration of the user equipment while the user equipment is positioned in the first geographic area. In an embodiment, reconfiguring the bandwidth part configuration of the user equipment includes modifying the plurality of bandwidth parts to include a second bandwidth part corresponding to a second geographic area. In an embodiment, the non-terrestrial network entity includes a transmitter configured to transmit the bandwidth part configuration and the reconfiguration of the bandwidth part configuration to the user equipment.

In an embodiment, the non-terrestrial network entity determines whether the at least one criterion for reconfiguring the bandwidth part configuration is met by determining whether a first distance from the position of the user equipment in the first geographic area to a boundary of the second geographic area is less than a first threshold and determining that the at least one criterion for reconfiguring the bandwidth part configuration is met in response to determining that the first distance from the position of the user equipment in the first geographic area to the boundary of the second geographic area is less than the first threshold.

In an embodiment, the non-terrestrial network entity determines whether the at least one criterion for reconfiguring the bandwidth part configuration is met by determining whether a second distance from the position of the user equipment in the first geographic area to a boundary of the first geographic area is less than a second threshold and determining that the at least one criterion for reconfiguring the bandwidth part configuration is met in response to determining that the second distance from the position of the user equipment in the first geographic area to the boundary of the first geographic area is less than the second threshold.

In an embodiment, the first and second geographic areas are adjacent. In an embodiment, the controller is configured to reconfigure the bandwidth part configuration of the user equipment while the user equipment is positioned in the first geographic area using radio resource control (RRC) signaling. In an embodiment, the controller is configured to determine to switch an active bandwidth part of the user equipment from the first bandwidth part to the second bandwidth part and send a command to the user equipment to switch the active bandwidth part using downlink control information (DCI). In an embodiment, the controller is configured to reconfigure the bandwidth part configuration of the user equipment by at least modifying the plurality of bandwidth parts to remove a third bandwidth part of the plurality of bandwidth parts.

In an embodiment, the controller is configured to determine to remove the third bandwidth part of the plurality of bandwidth parts by at least determining that, of the plurality of geographic areas included in the bandwidth part configuration, the position of the user equipment is farthest from a boundary of a third geographic area corresponding to the third bandwidth part. In an embodiment, the controller is configured to determine to remove the third bandwidth part of the plurality of bandwidth parts by at least determining that, of the plurality of geographic areas included in the bandwidth part configuration, the user equipment spends a least amount of time, sends a least amount of uplink data or receives a least amount of downlink data in a third geographic area corresponding to the third bandwidth part.

In an embodiment, a method includes determining a bandwidth part configuration for a user equipment, where the bandwidth part configuration includes a plurality of bandwidth parts respectively corresponding to a plurality of geographic areas. In an embodiment, the method includes configuring the user equipment with the bandwidth part configuration and determining a position or movement of the user equipment in a first geographic area of the plurality of geographic areas, where the first geographic area corresponds to a first bandwidth part of the plurality of bandwidth parts. In an embodiment, the method includes determining, based on the position or movement of the user equipment in the first geographic area, whether at least one criterion for reconfiguring the bandwidth part configuration is met and in response to determining that the at least one criterion for reconfiguring the bandwidth part configuration is met, reconfiguring the bandwidth part configuration of the user equipment while the user equipment is positioned in the first geographic area. In an embodiment, reconfiguring the bandwidth part configuration of the user equipment includes modifying the plurality of bandwidth parts to include a second bandwidth part corresponding to a second geographic area.

In an embodiment, determining whether the at least one criterion for reconfiguring the bandwidth part configuration is met includes determining whether a first distance from the position of the user equipment in the first geographic area to a boundary of the second geographic area is less than a first threshold and determining that the at least one criterion for reconfiguring the bandwidth part configuration is met in response to determining that the first distance from the position of the user equipment in the first geographic area to the boundary of the second geographic area is less than the first threshold.

In an embodiment, determining whether the at least one criterion for reconfiguring the bandwidth part configuration is met includes determining whether a second distance from the position of the user equipment in the first geographic area to a boundary of the first geographic area is less than a second threshold and determining that the at least one criterion for reconfiguring the bandwidth part configuration is met in response to determining that the second distance from the position of the user equipment in the first geographic area to the boundary of the first geographic area is less than the second threshold.

In an embodiment, the first and second geographic areas are adjacent. In an embodiment, the method includes reconfiguring the bandwidth part configuration of the user equipment while the user equipment is positioned in the first geographic area using radio resource control (RRC) signaling. In an embodiment, the method includes determining to switch an active bandwidth part of the user equipment from the first bandwidth part to the second bandwidth part and sending a command to the user equipment to switch the active bandwidth part using downlink control information (DCI). In an embodiment, reconfiguring the bandwidth part configuration of the user equipment includes at least modifying the plurality of bandwidth parts to remove a third bandwidth part of the plurality of bandwidth parts.

In an embodiment, determining to remove the third bandwidth part of the plurality of bandwidth parts includes at least determining that, of the plurality of geographic areas included in the bandwidth part configuration, the position of the user equipment is farthest from a boundary of a third geographic area corresponding to the third bandwidth part. In an embodiment, determining to remove the third bandwidth part of the plurality of bandwidth parts includes at least determining that, of the plurality of geographic areas included in the bandwidth part configuration, the user equipment spends a least amount of time, sends a least amount of uplink data or receives a least amount of downlink data in a third geographic area corresponding to the third bandwidth part.

DETAILED DESCRIPTION

Figure 1:
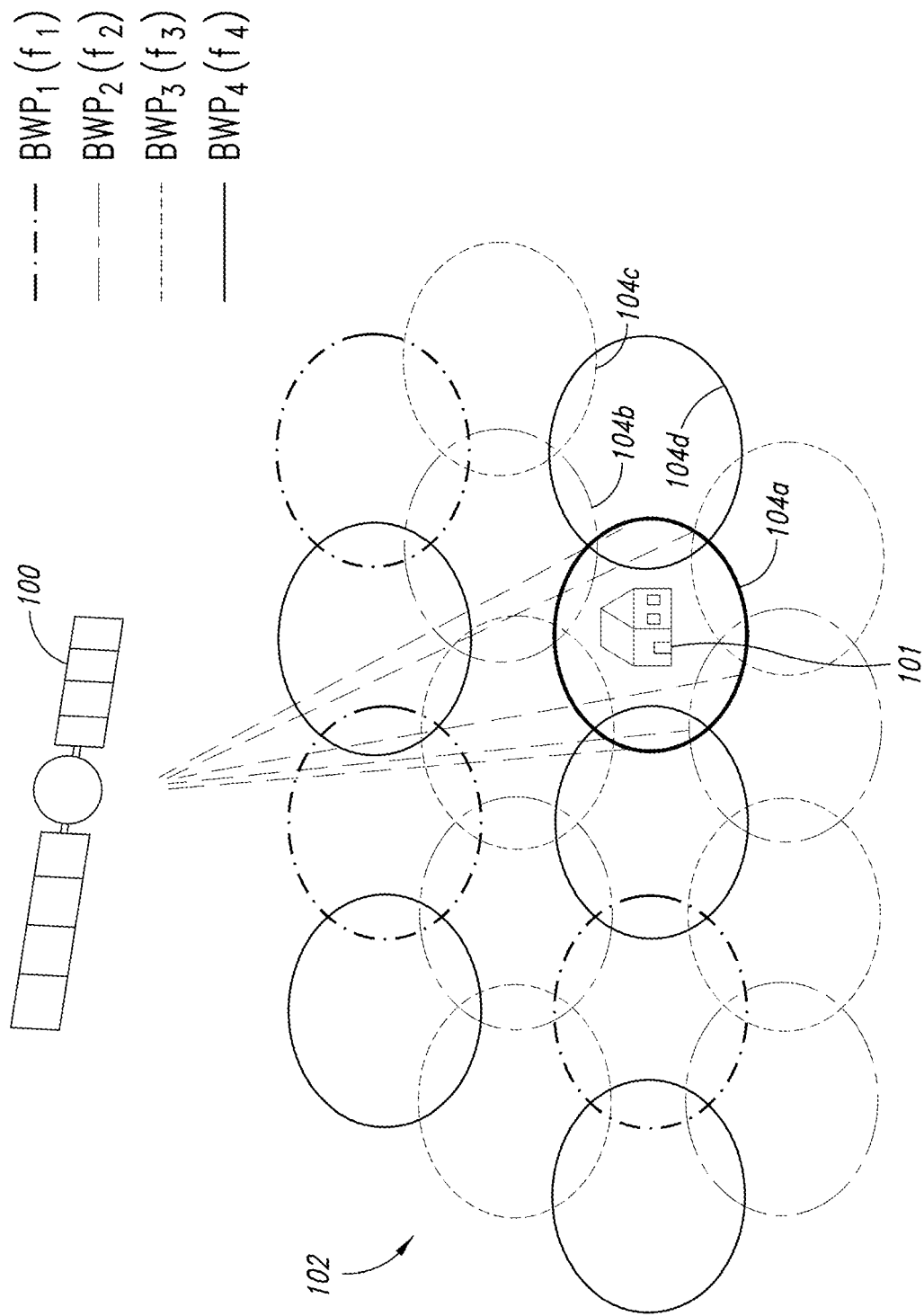
FIG. 1 shows an example of frequency reuse for a satellite in a non-terrestrial network.

FIG. 1 shows an example of frequency reuse for a satellite 100 in a non-terrestrial network. If the satellite 100 is a regenerative satellite, the satellite 100 may be a base station (denoted as 'NodeB' or in a 5G network as 'gNB') in a non-terrestrial network (NTN). If the satellite 100 is a bent-pipe satellite (also known as a transparent satellite), the base station may be located elsewhere in the non-terrestrial network and the satellite 100 may act as a relay for the base station. For example, the base station may be earthbound and on the ground.

The satellite has a coverage area 102 that is divided into a plurality of geographic areas, whereby each geographic area may be smaller than the coverage area 102. Spatial separation and frequency reuse are employed in the non-terrestrial network to reduce inter-beam interference and increase network capacity. Per the frequency reuse, a set of geographic areas 104a-d of the plurality of geographic areas are each assigned a respective bandwidth part (BWP) or frequency. User equipment 101, which may be a satellite television receiver or a cellular device, among others, is shown to be disposed in a first geographic area 104a. The user equipment 101 communicates with the satellite 100 using a bandwidth part or frequency that is assigned to the geographic area 104a. It is noted that the assignment of bandwidth part or frequency for uplink and downlink communication of the user equipment 101 may be independent of each other.

Figure 2:
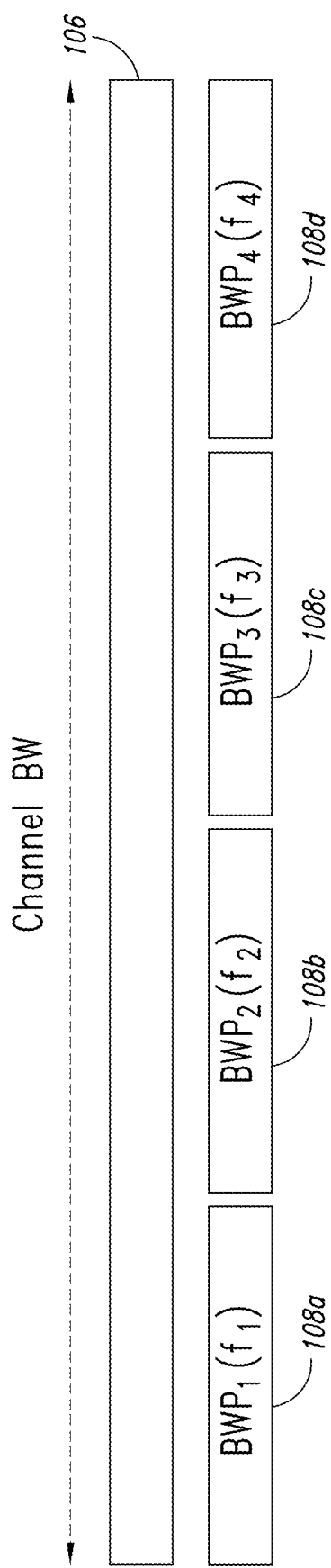
FIG. 2 shows an example of dividing a channel bandwidth of the satellite into a plurality of bandwidth parts.

FIG. 2 shows an example of dividing a channel bandwidth 106 of the satellite 100 into a plurality of bandwidth parts 108a-d. The plurality of bandwidth parts 108a-d includes first, second, third and fourth bandwidth parts 108a-d (denoted as "$BWP_1$", "$BWP_2$", "$BWP_3$", "$BWP_4$," respectively). The plurality of bandwidth parts 108a-d may be overlapping or non-overlapping in the channel bandwidth 106. The channel bandwidth 106 of the satellite 100 is divided into a plurality of subchannels.

As shown in FIG. 1, first, second, third and fourth geographic areas 104a, 104b, 104c, 104d of the set of geographic areas 104a-d are respectively assigned first, second, third and fourth bandwidth parts 108a-d. The bandwidth parts 108a-d are also referred to herein interchangeably as being frequencies ($BWP_1/f_1$, $BWP_2/f_2$, $BWP_3/f_3$, $BWP_4/f_4$). Frequency reuse is employed such that neighboring geographic areas also use the bandwidth parts 108a-d. For example, a set of four other neighboring geographic areas of the plurality of geographic areas may respectively use the plurality of bandwidth parts 108a-d.

Thus, the coverage area 102 of the satellite 100 is divided into geographic areas that are spatially separated. The geographic areas are assigned independent bandwidth parts 108a-d depending on a reuse factor (denoted as 'K'). Four geographical areas 104a-d are illustrated in FIG. 1 thereby making the frequency reuse factor for the environment four (K=4). Although four geographical areas 104a-d are illustrated, it is noted that any other reuse factor may be used. Thus, satellite communication in a geographic area may use the same frequency as another area and the coverage area 102 provided that the geographic areas are spatially separated (for example, non-neighboring) or sufficiently distanced apart.

The user equipment 101 may be configured to communicate over any number of bandwidth parts. For example, the user equipment 101 may be configured to communicate over four uplink bandwidth parts and four downlink bandwidth parts, among other types of configurations. The user equipment 101 may have one active uplink bandwidth part and one active downlink bandwidth part at any one time instance. An active bandwidth part is the bandwidth part (of the bandwidth parts with which the user equipment 101 is configured) that the user equipment 101 may presently use to communicate with the non-terrestrial network via the satellite 100 (for example, depending on the geographic area 104 in which the user equipment 101 is disposed). The remaining bandwidth parts with which the user equipment 101 is configured may be inactive for the user equipment 101 and may not be used by the user equipment 101 to communicate, through satellite 100, with the non-terrestrial network.

The user equipment 101 may switch from one active bandwidth part to another, for example, as a result of movement or relocation of the user equipment 101 from one geographic area 104 to another geographic area 104. That is, depending on the bandwidth parts used in the geographic area 104 in which the user equipment 101 is disposed, the user equipment 101 may use, as an active bandwidth part, any one of the plurality of bandwidth parts 108a-d. In addition to relocation, the user equipment 101 may change its active bandwidth part due at least in part to bandwidth part reassignment of the geographic area 104 in which the user equipment 101 is disposed.

The non-terrestrial network or an entity thereof, such as the base station, may command the user equipment 101, through satellite 100, to change its active bandwidth part by radio resource control (RRC) signaling or level 1 downlink control information (L1 DCI), among others. RRC signaling may be slower than DCI signaling. Further, uplink and downlink bandwidth parts of the user equipment 101 may be switched independently of each other or depending on one another.

Figure 3:
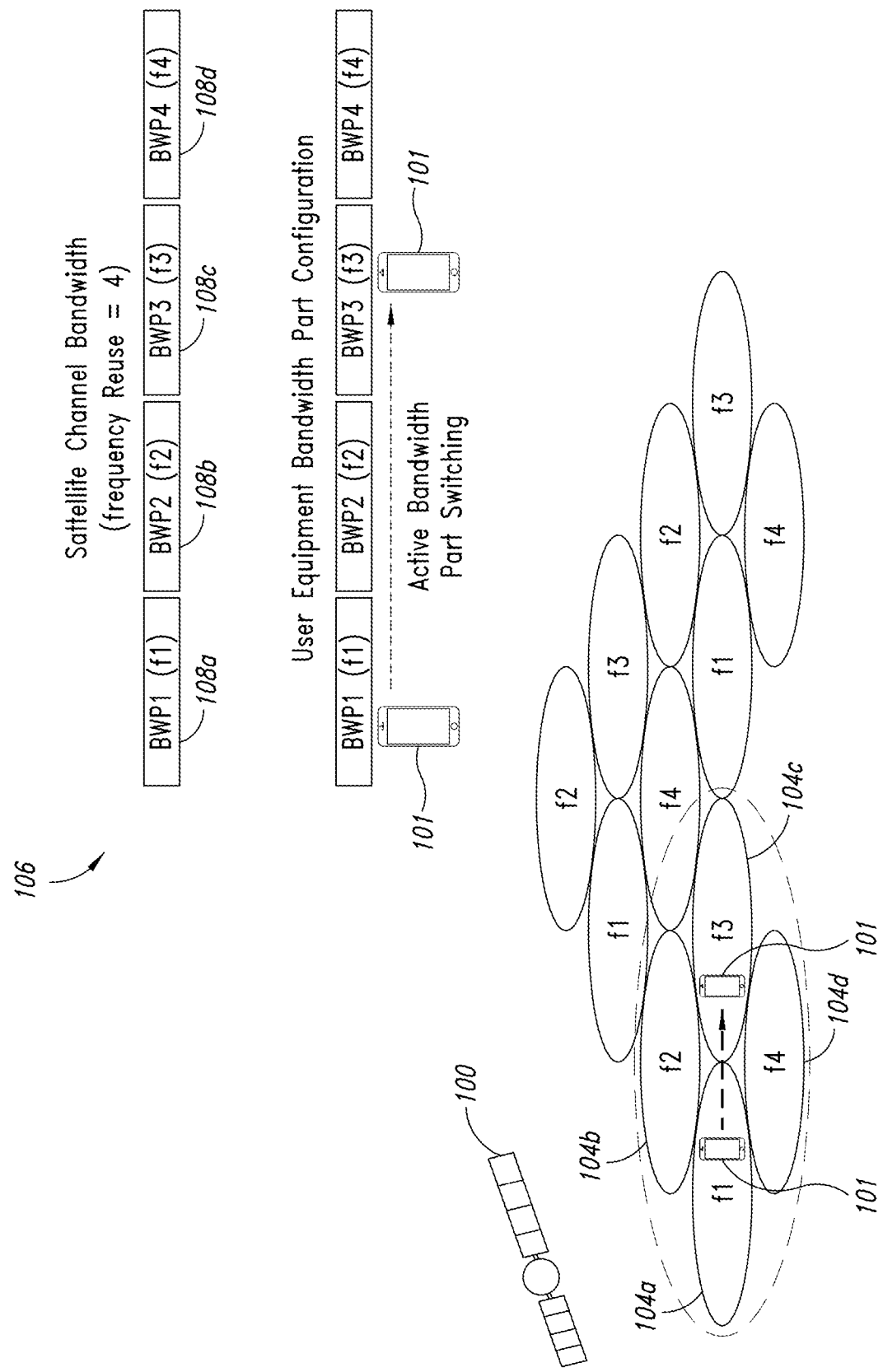
FIG. 3 shows an example of user equipment active bandwidth part switching.

FIG. 3 shows an example of user equipment 101 active bandwidth part switching. In FIG. 3, the reuse factor of the satellite 100 is the same as the number of bandwidth parts in the user equipment 101 bandwidth part configuration. Both the reuse factor of the satellite 100 and the number of configured bandwidth parts of the user equipment 101 are four. Depending on the geographic area 104, the satellite 100 (whether acting as a base station (or NodeB) or a relay for the base station) utilizes one of a plurality of bandwidth parts 108a-d for communicating with user equipment 101 in the geographic area 104. The user equipment 101 is configured to communicate over the plurality of bandwidth parts 108a-d, whereby at any one point one of the bandwidth parts 108 is active.

The user equipment 101 is initially positioned in the first geographic area 104a, whereby the active bandwidth part of the user equipment is the first bandwidth part 108a. The user equipment 101 then moves to the third geographic area 104c. The third geographic area 104c is served by the third bandwidth part 108c. As a result of the relocation, the user equipment 101 switches its active bandwidth part from the first bandwidth part 108a to the third bandwidth part 108c. The first bandwidth part 108a becomes inactive. A non-terrestrial network entity or the satellite 100 may transmit RRC signaling or a DCI to a user equipment 101 commanding the user equipment to switch its active bandwidth part.

Figure 4:
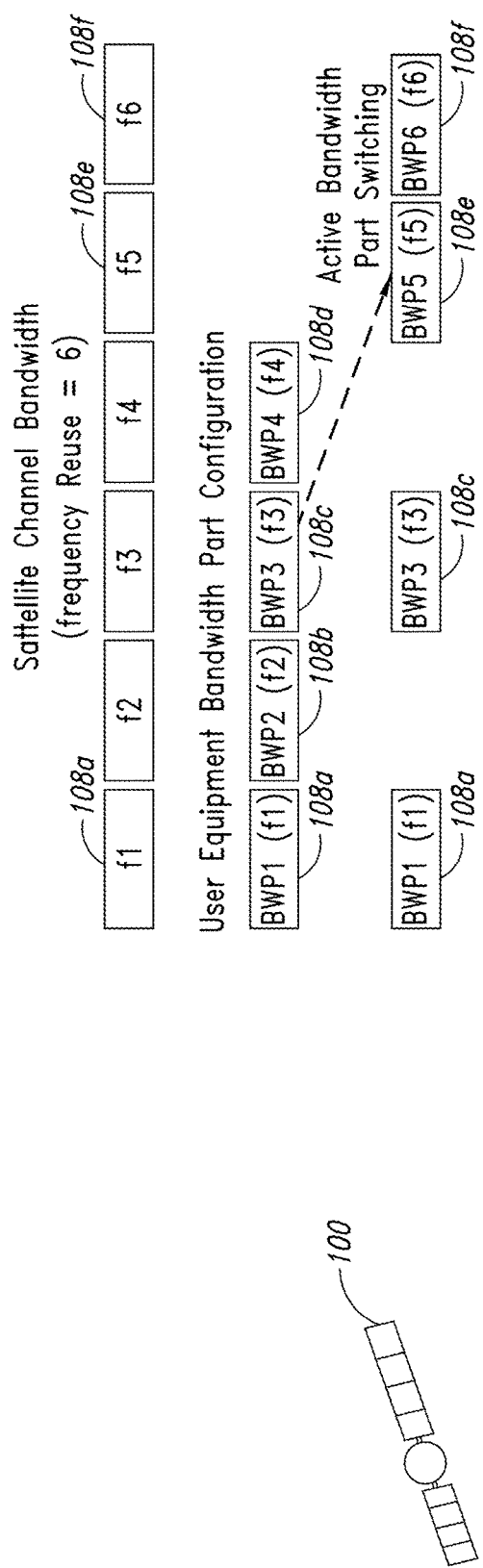
FIG. 4 shows an example of user equipment active bandwidth part switching.
Figure 4:
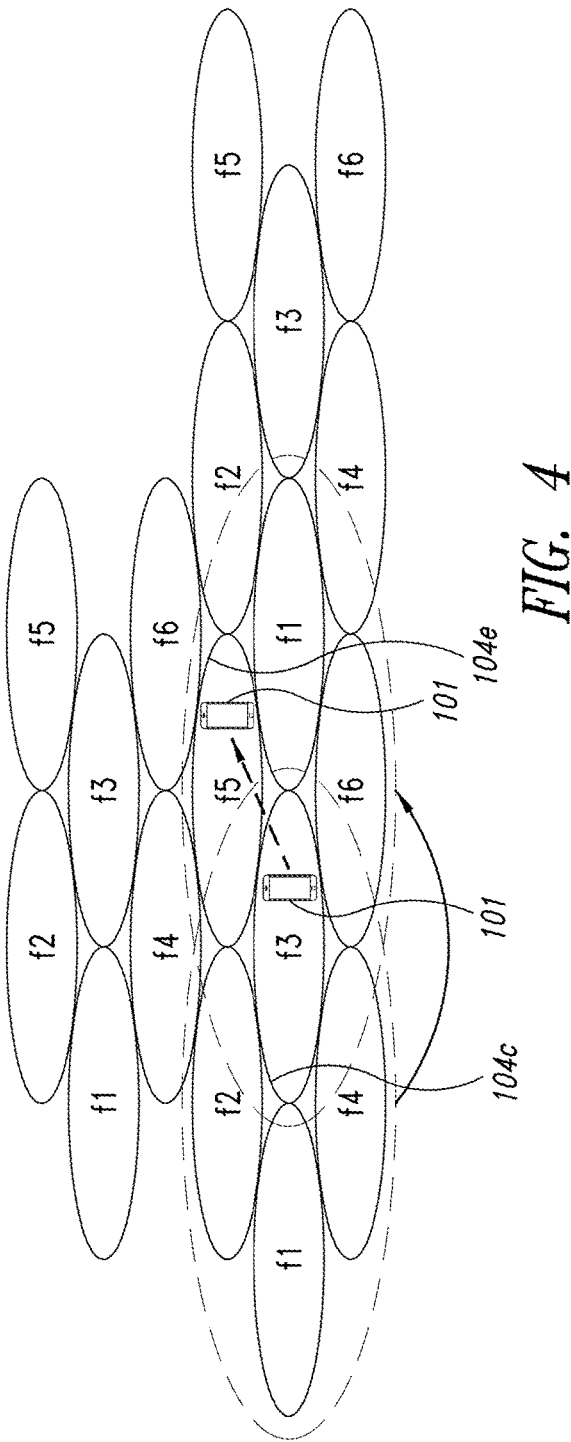

In the example illustrated in FIG. 4, the bandwidth parts with which the user equipment 101 is configured are identical to the bandwidth parts used by the satellite 100. Accordingly, the user equipment 101, when moving between geographic areas 104, switches between configured bandwidth parts. Reconfiguration of the bandwidth parts of the user equipment 101 is thereby not needed.

However, as described herein, when the user equipment 101 is configured with the bandwidth parts are different than the bandwidth parts of the satellite 100, the bandwidth parts of the user equipment 101 may be reconfigured when the user equipment 101 switches between bandwidth parts.

FIG. 4 shows an example of user equipment 101 active bandwidth part switching. The frequency reuse factor of the satellite 100 is different from the number of bandwidth parts in the user equipment 101 bandwidth part configuration. The frequency reuse factor of the satellite 100 is six, whereas the number of configured bandwidth parts of the user equipment 101 is four. The channel bandwidth 106 of the satellite 100 into six bandwidth parts 108a-f that are respectively assigned to six geographic areas 104a-f.

Initially, the user equipment 101 is configured with the first, second, third and fourth bandwidth parts 108a-d and is located in the third geographic area 104c. The active bandwidth part of the user equipment 101 is the third bandwidth part 108c. The user equipment 101 moves from the third geographic area 104c to the fifth geographic area 104e. The fifth geographic area 104e is served by the fifth bandwidth part 108e, which is not within the user equipment bandwidth part configuration.

The non-terrestrial network, through the satellite 100, changes the user equipment bandwidth part configuration. The satellite 100 may at least add the fifth bandwidth part 108e to the user equipment bandwidth part configuration and correspondingly remove one other bandwidth part from the configuration to keep the number of bandwidth parts in the configuration constant. A non-terrestrial network entity or the satellite 100, may transmit RRC signaling to the user equipment to configure the bandwidth parts of the user equipment 101.

As shown in FIG. 4, the non-terrestrial network, through the satellite 100, changes the bandwidth part configuration of the user equipment (from the first, second, third and fourth bandwidth parts 108a-d) to the first, third, fifth and sixth bandwidth parts 108a, 108c, 108e, 108f. Now that the new bandwidth part configuration of the user equipment 101 includes the fifth bandwidth part 108e, the user equipment 101 may use the fifth bandwidth part 108e as the active bandwidth part in the fifth geographic area 104e. The user equipment 101 may switch to the fifth bandwidth part 108e as the active bandwidth part in response to receiving RRC signaling or a DCI from a non-terrestrial network entity or the satellite 100 as described herein.

The bandwidth part of the user equipment 101 may be configured or reconfigured based on user equipment 101 movement history or a prediction algorithm, among others. For example, it may be desirable for the bandwidth part configuration of the user equipment 101 to be optimally selected in order to minimize RRC signaling. For example, the satellite 100 or another non-terrestrial network entity may track movement of the user equipment 101 and may obtain, based on the tracking, a list of geographic areas 104 frequently visited by the user equipment 101. The satellite 100 or another non-terrestrial network entity may configure the user equipment bandwidth part configuration to include the bandwidth parts 108 of the most frequently visited geographic areas 104. If that the most frequently visited geographic areas 104 do not include the geographic area to which the user equipment moved, the bandwidth part configuration may be revised to include the bandwidth part 108 of the geographic area 104 to which the user equipment moved (for example, by swapping the bandwidth part 108 of the geographic area 104 with another on the list of most frequently visited geographic areas 104).

In an embodiment where the bandwidth part configuration of the user equipment 101 includes four (or a maximum of four) bandwidth parts 108, the bandwidth parts 108 of the four most frequently visited geographic areas 104 may be included in the configuration. If that the bandwidth part 108 of the geographic area 104 to which the user equipment 101 moved is not among the bandwidth parts 108 of the four most frequently visited geographic areas 104, the bandwidth part 108 of the fourth most frequently visited geographic areas 104 may be removed from the configuration and replaced with the bandwidth part 108 of the geographic area 104 to which the user equipment 101 moved.

Setting the user equipment bandwidth part configuration may be based on prediction of user equipment 101 movement. For example, if the movement of the user equipment 101 indicates forthcoming transition to one or more different geographic areas 104, the satellite 100 or another non-terrestrial network entity may configure the user equipment bandwidth part configuration to include the bandwidth parts 108 of the one or more different geographic areas 104. Predicting the user equipment 101 movement may be based on past or historical movement of the user equipment or other user equipment served by the satellite 100 or another non-terrestrial network entity. Accordingly, the reconfiguration of the user equipment 101 bandwidth part configuration may be minimized.

A satellite cluster may be defined as a set of satellite beams, where none of the beams use the same frequency. The set of satellite beams in a cluster may be $f_1, f_2, \ldots, f_K$ (K is the frequency reuse factor). The union of the set of satellite beams in the cluster may cover the entire system channel bandwidth.

As described herein, each satellite beam corresponds to a bandwidth part 108 and may be covered by bandwidth part 108. Accordingly, the resources of the satellite beams of the cluster may not overlap in frequency because they independently correspond to different bandwidth parts 108 of the system channel bandwidth 106. The time and frequency resources of satellite beams of a cluster may overlap and are, thus, not orthogonal in the time and frequency domains. However, the satellite beams of the cluster are orthogonal in the space domain. Different clusters are also spatially orthogonal with one another but are not orthogonal in the time and frequency domains.

Each cluster may have a unique identifier. The number of satellite clusters (L) may depend on the channel frequency. For example, if the channel frequency is less than or equal to three GigaHertz (GHz), the number of satellite clusters may be 4. If the channel frequency is greater than three GHz but less than or equal to 7.125 GHz, the number of satellite clusters may be eight and if the frequency is greater than 7.125 GHz, then the number of satellite clusters may be L=64.

In an embodiment, a satellite 100 may cover a large geographic region, such as the contiguous United States. The satellite 100 may have multiple clusters (L) necessary to cover the geographic region, where each cluster covers K geographic areas 104. Alternatively, more than one satellite 100 may cover a large geographic region, such as the contiguous United States. Satellite-to-satellite handover may be performed.

Figure 5:
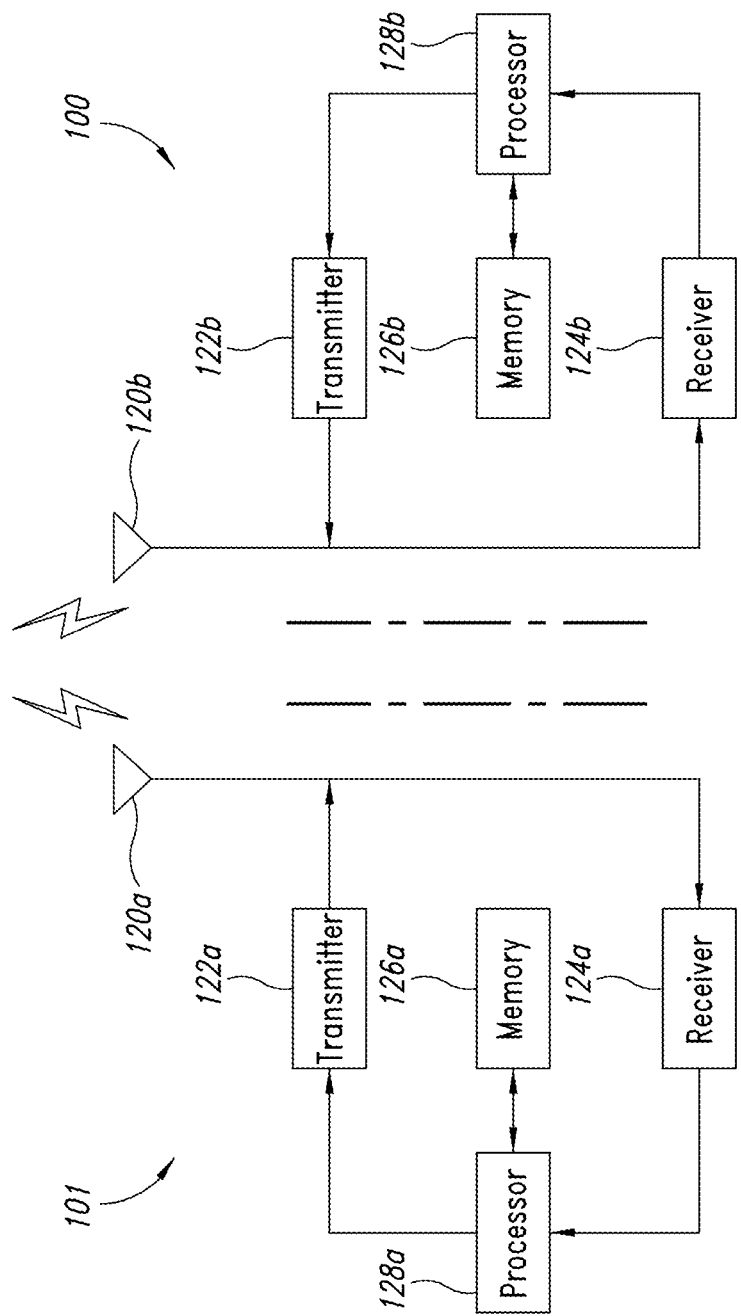
FIG. 5 is a block diagram of a satellite and user equipment.

FIG. 5 is a block diagram of a satellite 100 and user equipment 101. As described herein, the satellite 100 may be a base station. The user equipment 101 transmits in the uplink and receives in the downlink. The satellite 100 receives in the uplink and transmits in the downlink. The user equipment 101 and the satellite 100 respectively include one or more antennas 120*a*, 120*b* for receiving signals, which may be electromagnetic signals.

The user equipment 101 and the satellite 100 respectively include a transmitter 122*a*, 122*b*. The transmitter 122*a*, 122*b* may be any type of device configured to transmit a signal by controlling the one or more antennas 120*a*, 120*b*, respectively. The user equipment 101 and the satellite 100 respectively include a receiver 124*a*, 124*b*, which may be any type of device configured to transmit a signal by controlling the one or more antennas 120*a*, 120*b*, respectively.

The user equipment 101 and the satellite 100 or another non-terrestrial network entity respectively include memory 126*a*, 126*b*. The memory 126*a*, 126*b* may be any type of non-transitory computer-readable storage medium. The memory 126*a*, 126*b* may be read-only memory (ROM) or random access memory (RAM), among others. Further, the memory 126*a*, 126*b* may be static or dynamic. The memory 126*a*, 126*b* stores the computer-executable instructions that may be retrieved or accessed by a respective processor 128*a*, 128*b* for execution. The computer-executable instructions, when executed by the respective processor 128*a*, 128*b*, cause the respective processor 128*a*, 128*b* (or user equipment 101 satellite 100) to operate as described herein.

The user equipment 101 and the satellite 100 or another non-terrestrial network entity include the processor 128*a*, 128*b*, respectively. The processor 128*a*, 128*b* is configured to perform the techniques and methods described herein. The transmitter 122*a*, 122*b*, the memory 126*a*, 126*b*, the receiver 124*a*, 124*b*, the processor 128*a*, 128*b* and the one or more antennas 120*a*, 120*b* within the user equipment 101 or the satellite 100 may be configured to mutually interact with one another. The transmitter 122*a*, receiver 124*a*, memory 126*a* and processor 128*a* of the user equipment 101 may respectively be implemented by a separate chip as independent elements, or may be implemented by two or more chips. The transmitter 122*a*, 122*b* and the receiver 124*a*, 124*b* may be incorporated into one device, whereby one transceiver may be implemented within the user equipment 101 or the satellite 100 or another non-terrestrial network entity. The one or more antennas 120*a*, 120*b* configured to wirelessly transmit a signal generated by the transmitter 122*a*, 122*b* to an external environment, or receive a radio signal from the external environment and transfer the received radio signal to the receiver 124*a*, 124*b*. Transmission and reception devices that support multi-input multi-output (MIMO) communication for data transmission and reception based on multiple antennas may be used.

The processor 128*a*, 128*b* generally controls the overall operation of the user equipment 101 or the satellite 100. In particular, the processor 128*a*, 128*b* may perform various control functions for performing the techniques described herein, a variable Medium Access Control (MAC) frame control function based on service characteristics and a propagation environment, a power saving mode for controlling an idle mode operation, a handover (HO) function, an authentication and encryption function, and the like. The processor 128*a*, 128*b* may be a controller, a microcontroller, a microprocessor, or a microcomputer. The processor 128*a*, 128*b* may be implemented by hardware, firmware, software, or their combination. An application specific integrated circuits (ASICs), digital signal processors (DSPs), digital signal processing devices (DSPDs), programmable logic devices (PLDs), and field programmable gate arrays (FPGAs), which are configured to perform the techniques described herein, may be provided in the processor 128a, 128b.

The transmitter 122a, 122b may perform coding and modulation of data, which are scheduled from the processor 128a, 128b or a scheduler coupled to the processor 128a, 128b. For example, the transmitter 122a, 122b may convert data streams intended for transmission into signal streams through de-multiplexing, channel coding, modulation, and the like. The signal streams are transmitted through a transmitting processor within the transmitter and the transmitting antenna 120a, 120b in due order. The transmitter 122a, 122b and the receiver 124a, 124b of the user equipment 101 and the satellite 100 may be configured differently depending on a processing procedure of transmitting and receiving signals.

It is noted that when the satellite 100 is a regenerative satellite, the satellite 100 may include the memory 126b and the processor 128b. Conversely, if the satellite 100 is a bent-pipe satellite that acts as a relay for another non-terrestrial network entity, such a base station, the satellite 100 may not include the memory 126b or the processor 128b. As a bent-pipe satellite (transparent satellite), the satellite 100 may include an amplifier, filter, frequency converter and transmitter and may not include memory or processing functionality.

A regenerative satellite may configure the user equipment 101 with the user equipment bandwidth part configuration and switch the active bandwidth part of the user equipment 101. Conversely, a transparent satellite may act as a relay for a base station in another part of the non-terrestrial network, whereby the base station controls bandwidth part configuration and switching of the user equipment 101.

The satellite 100 or another network entity may determine a position (or geographic physical location) of the user equipment 101. The other network entity may be a satellite gateway, high altitude platform station as International Mobile Telecommunications base station (HIBS), 5G core network or mixed access network, such as a 3GPP NTN mixed access network, among others. Determining the position may be performed based on any localization technique. For example, the user equipment 101 may include global positioning system (GPS) capability and may, accordingly, communicate with Earth-orbiting GPS satellites for identifying the position of the user equipment 101 via triangulation. The user equipment 101 may include GPS circuitry having a GPS transceiver via which the user equipment 101 communicates with the Earth-orbiting GPS satellites. The user equipment 101 or an Earth-orbiting GPS satellite may determine the position of the user equipment 101 on Earth.

In addition or alternatively, the user equipment 101 or another network entity may determine the position of the user equipment 101 using Wi-Fi positioning. It is noted that a non-terrestrial network may rely on GPS positioning due to the fact that the non-terrestrial network provides outdoor coverage, where GPS allows for positioning. However, Wi-Fi positioning utilizes Wi-Fi hotspots and/or access points (APs) to determine the location of the user equipment 101. Additionally or alternatively, the user equipment 101 or the other network entity may determine the position of the user equipment 101 using an Assisted Global Navigation Satellite System (A-GNSS).

The user equipment 101 may determine its own position and send the position to the satellite 100 or the other network entity. The satellite 100 or the other network entity may configure/reconfigure the user equipment bandwidth part configuration of the user equipment 101 based on the position.

Figure 6:
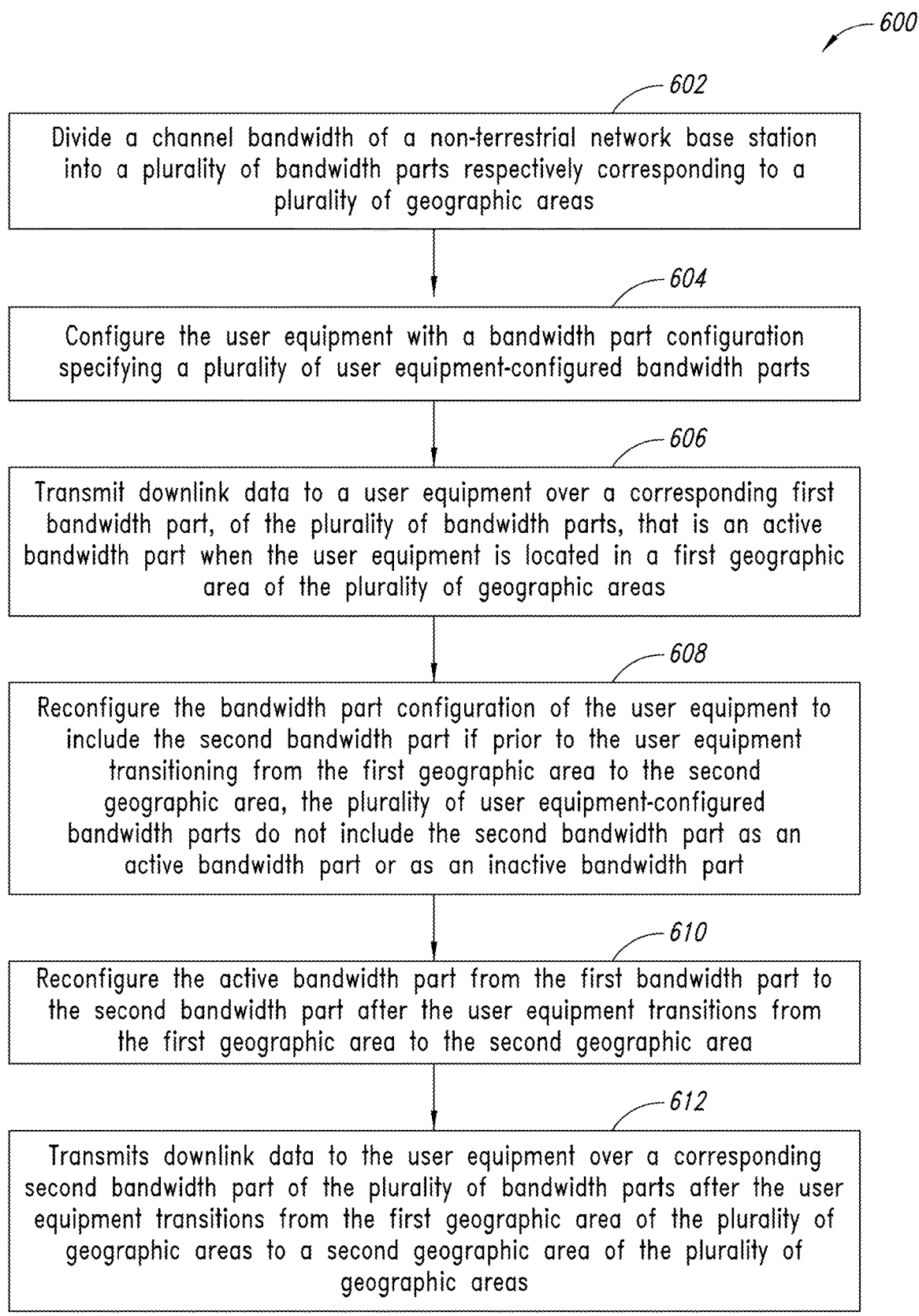
FIG. 6 shows a method for beam switching in a non-terrestrial network.

FIG. 6 shows a method 600 for beam switching in a non-terrestrial network. The method 600 includes dividing, at 602, a channel bandwidth of a non-terrestrial network base station into a plurality of bandwidth parts respectively corresponding to a plurality of geographic areas. Each bandwidth part of the plurality of bandwidth parts may be respectively associated with a satellite beam of a plurality of satellite beams. At 604, the non-terrestrial network base station configures the user equipment with a bandwidth part configuration specifying a plurality of user equipment-configured bandwidth parts. When the user equipment is located in the first geographic area of the plurality of geographic areas, the plurality of user equipment-configured bandwidth parts include the first bandwidth part as an active bandwidth part and remaining bandwidth parts of the plurality of user equipment-configured bandwidth parts are inactive bandwidth parts.

At 606, the non-terrestrial network base station transmits downlink data to a user equipment over a corresponding first bandwidth part, of the plurality of bandwidth parts, when the user equipment is located in a first geographic area of the plurality of geographic areas. At 608, the non-terrestrial network base station reconfigures the bandwidth part configuration of the user equipment to include the second bandwidth part if prior to the user equipment transitioning from the first geographic area to the second geographic area, the plurality of user equipment-configured bandwidth parts do not include the second bandwidth part as the active bandwidth part or as an inactive bandwidth part.

At 610, the non-terrestrial network base station reconfigures the active bandwidth part from the first bandwidth part to the second bandwidth part after the user equipment transitions from the first geographic area to the second geographic area. At 612, the non-terrestrial network base station, after the user equipment transitions from the first geographic area of the plurality of geographic areas to a second geographic area of the plurality of geographic areas, transmits downlink data to the user equipment over a corresponding second bandwidth part of the plurality of bandwidth parts. After the user equipment transitions from the first geographic area to the second geographic area, the plurality of user equipment-configured bandwidth parts include the second bandwidth part as the active bandwidth part and remaining bandwidth parts of the plurality of user equipment-configured bandwidth parts are inactive bandwidth parts.

When the number of bandwidth parts (denoted 'N') in the user equipment bandwidth part configuration is the same as or greater than the frequency reuse factor (K), the user equipment bandwidth part configuration generally includes the bandwidth parts that could potentially be used by the user equipment 101. For example, the number of bandwidth parts (N) may be up to four (one, two, three or four). Thus, reconfiguration of the user equipment bandwidth part configuration to add bandwidth parts that may potentially be used by the user equipment 101 may not be performed.

However, when N<K, the user equipment bandwidth part configuration does not include all bandwidth parts that could potentially be used by the user equipment 101. Accordingly, the satellite 100 or another entity may reconfigure the user equipment bandwidth part configuration to add bandwidth parts that may potentially be used by the user equipment 101 or that are likely to be used by the user equipment 101. Furthermore, the satellite 100 or the other entity may remove, from the user equipment bandwidth part configuration, bandwidth parts that are less likely to be used by the user equipment 101. The configuration or reconfiguration of the user equipment bandwidth part configuration may be performed based on a position (physical location) of the user equipment 101.

Figure 7:
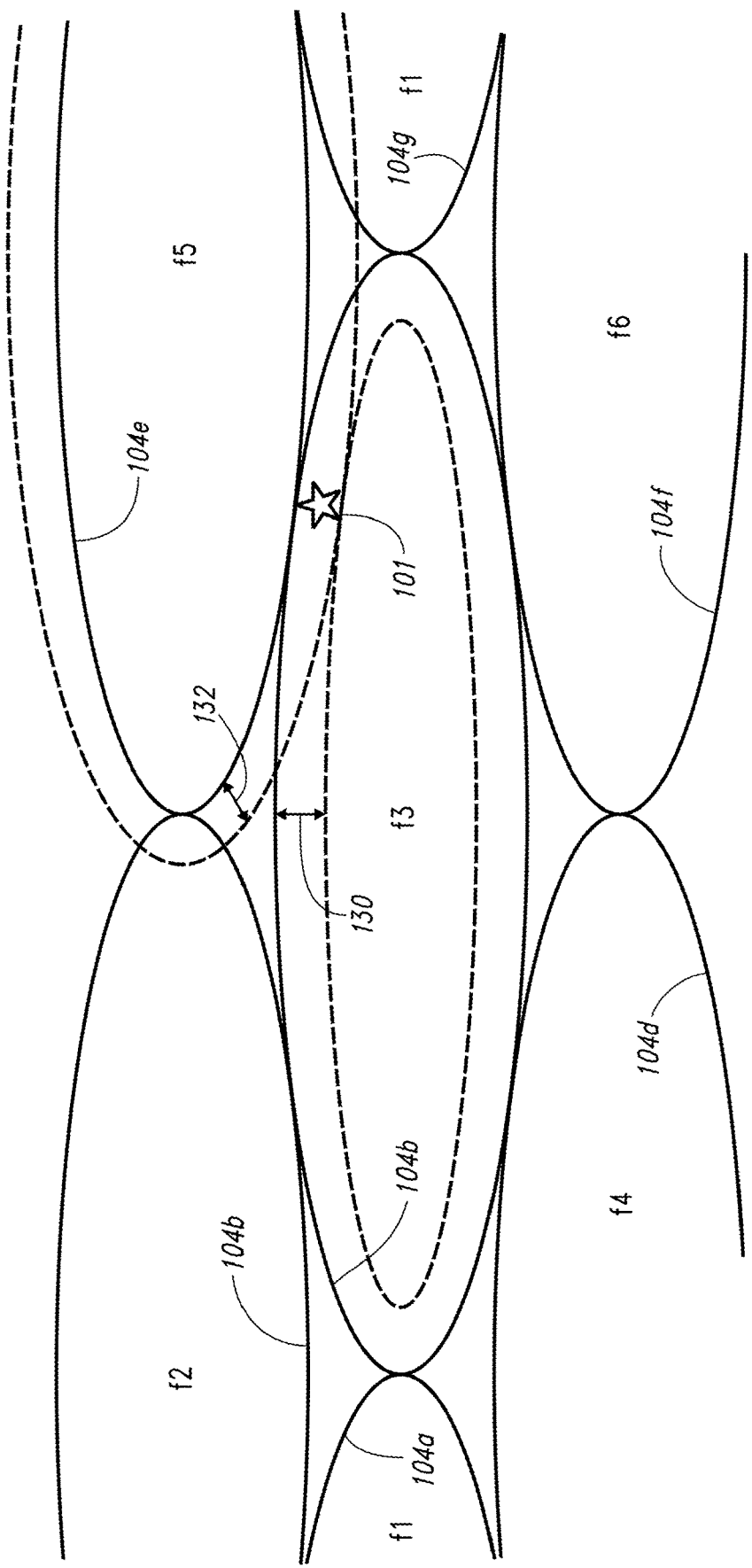
FIG. 7 shows the user equipment at an edge of a geographic area associated with a bandwidth part.

FIG. 7 shows the user equipment 101 at an edge of a geographic area associated with a bandwidth part. Similar elements of FIG. 7 as those described with reference to FIG. 4 have the same reference numerals. The user equipment 101 is at an edge of the third geographic area 104c associated with the third bandwidth part 108c. The user equipment 101 is in a proximity of the fifth geographic area 104e associated with the fifth bandwidth part 108e. The user equipment 101 uses the third bandwidth part 108c to communicate in the uplink or downlink when the user equipment 101 is at the edge of the third geographic area 104c. The bandwidth part configuration of the user equipment 101 includes the first, second, third and fourth bandwidth parts 108a-d but does not include the fifth bandwidth part 108e.

The satellite 100 may receive or determine a position of the user equipment 101. The satellite 100 may have information indicating the geographic boundaries of the geographic areas 104. For example, the satellite 100 may store the information in the memory 126b. The satellite 100 may determine a first distance between the position of the user equipment 101 and the geographic boundary of the third geographic area 104c in which the user equipment 101 is located. The satellite 100 may determine a second distance between the position of the user equipment 101 and the geographic boundary of a geographic area in a proximity of the third geographic area 104c. The geographic area in the proximity of the third geographic area 104c may be an adjacent geographic area or a surrounding geographic area. The second distance may be determined for multiple geographic boundaries in the proximity of the third geographic area 104c in which the user equipment 101 is located. For example, multiple second distances may be determined for the first, second, fourth, fifth, sixth and seventh geographic areas 104a, 104b, 104d, 104e, 104f, 104g. Because the boundary of a geographic area is a line, the second distance may be a minimum distance or a distance from the user equipment 101 to a nearest point of the boundary of the geographic area.

The satellite 100 may determine whether one or more criteria for reconfiguring the user equipment bandwidth part configuration are met. For a first criterion, the satellite 100 may compare the first distance to a first threshold 130 to determine whether the first distance is less than the first threshold 130. To determine whether a second criterion is met, the satellite 100 may compare the second distance to a second threshold 132 and determine whether the second distance is less than the second threshold 132. For the purposes of reconfiguring the user equipment bandwidth part configuration, the satellite 100 may determine whether the second criterion is met only for geographic areas corresponding to bandwidth parts that are not part of or that are not included in a presently-existing user equipment bandwidth part configuration.

Determining that the first criterion is met is indicative of a higher likelihood or a prediction that the user equipment 101 will depart the geographic area in which the user equipment 101 is located. Determining that the second criterion is met is indicative of a higher likelihood or prediction that the user equipment 101 will enter a different geographic area than the one in which the user equipment 101 is presently located.

In response to determining that the first criterion and/or the second criterion are met, the satellite 100 evaluates whether to change the user equipment bandwidth part configuration. The satellite 100 determines whether the user equipment bandwidth part configuration is to be reconfigured or modified to include a bandwidth part (or corresponding satellite beam) and/or remove a bandwidth part. Making reference to FIG. 7, the satellite 100 may determine that second criterion is met for the fifth geographic area 104e. Accordingly, the satellite 100 may reconfigure the user equipment bandwidth part configuration to include the fifth bandwidth part 108e. If the user equipment bandwidth part configuration utilizes all of the number of bandwidth parts (N), addition of the fifth bandwidth part 108e is accompanied by removal of a bandwidth part from the configuration.

The satellite 100 may determine the bandwidth part to remove based on the position of the user equipment 101. For example, the satellite 100 may determine a geographic area that the user equipment 101 is least likely to be enter. The satellite 100 may determine, for each geographic area having a corresponding bandwidth part that is included in the configuration, a distance between the position of the user equipment 101 and the boundary of the geographic area. The distance is positively correlated with the likelihood that the user equipment 101 will enter the geographic area. The satellite 100 may determine the geographic area having the maximum distance (or is farthest) from the user equipment 101, and the satellite 100 may remove the bandwidth part corresponding to the geographic area.

The satellite 100 may determine, among the geographic area having a corresponding bandwidth part that is included in the configuration, a geographic area in which the user equipment 101 spends the fewest amount (or proportion) of time, and the satellite 100 may remove the bandwidth part corresponding to the geographic area. The satellite 100 may determine, among the geographic area having a corresponding bandwidth part that is included in the configuration, a geographic area in which the user equipment 101 traffics the least amount (or proportion) of data in the uplink or downlink, and the satellite 100 may remove the bandwidth part corresponding to the geographic area with the least amount of data.

The satellite 100 may remove the bandwidth part of a geographic area that is diametrically opposed to the geographic area that the user equipment 101 is nearing entry. For example, if the user equipment 101 is in a proximity of the fifth geographic area 104e, the satellite 100 may remove the bandwidth part of the fourth geographic area 104d. If the user equipment 101 is in a proximity of the sixth geographic area 104f, the satellite 100 may remove the bandwidth part of the second geographic area 104b.

Reconfiguring the user equipment bandwidth part configuration makes the fifth bandwidth part 108e of the fifth geographic area 104e available for use by the user equipment 101. The user equipment 101 may switch to the fifth bandwidth part 108e (in the fifth geographic area 104e) as the active bandwidth part and communicate in the uplink or downlink using the fifth bandwidth part 108e, for example, upon exiting the third geographic area 104c and/or entering the fifth geographic area 104e.

The user equipment 101 may have independent bandwidth part configurations for the uplink and downlink. The satellite 100 may reconfigure the user equipment bandwidth part configurations of the uplink and downlink in the same manner or differently. The satellite 100 may configure or reconfigure the user equipment bandwidth part configuration and bandwidth parts thereof using RRC signaling or L1 DCI signaling. The satellite 100 may also switchover or change the active bandwidth part of the user equipment 101 using RRC signaling or L1 DCI signaling. For example, the satellite 100 may use RRC signaling to transmit the bandwidth part configuration to the user equipment 101 and use L1 DCI signaling to transmit a command to the user equipment 101 to change the active bandwidth part of the user equipment 101.

The prediction described herein enables the satellite 100 to use RRC signaling to reconfigure the bandwidth part configuration. RRC signaling may be slower than L1 DCI signaling. Anticipation of a forthcoming bandwidth part switch permits the satellite 100 and allows time to the satellite 100 to use a slower signaling technique to reconfigure the bandwidth part configuration. Accordingly, the satellite 100 prepares the user equipment 101 to switch to a new active bandwidth part. In response to the user equipment 101 transitioning to a new geographic area covered by a different bandwidth part, the satellite 100 may use a faster signaling technique, such as L1 DCI signaling, to command the user equipment 101 to switch to the new bandwidth part as the active bandwidth part. The new bandwidth part has been included as a configured bandwidth part using RRC signaling.

In addition to or in place of using a determined position of the user equipment 101, the satellite 100 may use an estimated future position of the user equipment 101 to reconfigure the bandwidth part configuration. The satellite 100 may determine the estimated future position based on a current position, speed and/or direction of movement of the user equipment 101. The estimated future position may be a position that the user equipment 101 is expected to be at a future time point. The future time point may be 1, 2 or 5 minutes, among others. The satellite may identify geographic areas that the user equipment 101 is likely to enter during a period of time and reconfigure the bandwidth part configuration to include bandwidth parts corresponding to the geographic areas.

It is noted that the bandwidth part and beam switching and configuration operations described herein may be performed by the satellite 100 or another network entity. The satellite 100 may utilize artificial intelligence and machine learning to predict the behavior of the user equipment 101 and optimize the bandwidth part configuration and minimize RRC signaling for beam switching.

The satellite 100 may maintain statistics of beam switching history and use the statistics to configure or reconfigure the bandwidth part configuration. For example, the statistics may be based on historical observations of a time when the user equipment 101 switches active bandwidth parts. The time may be a time of day or day of week, month or year. The satellite 100 may anticipate that the user equipment 101 will switch to a new bandwidth part and may reconfigure the bandwidth part configuration to include the new bandwidth part.

The satellite 100 may also utilize signal power indicators to configure or reconfigure the bandwidth part configuration. The signal power indicators may include a signal quality indicator (CQI) or an uplink or downlink power control signal. The satellite 100 may determine that the user equipment 101 is at or near an edge of a geographic area if the signal power indicator is below a threshold. The signal power indicators may also indicate to the satellite 100 a geographic area that the user equipment 101 is likely to enter. Determining that the user equipment 101 is at or near the edge may trigger the satellite 100 to reconfigure the bandwidth part configuration as described herein. The satellite 100 may include bandwidth parts of geographic areas in a proximity to the edge.

Figure 8:
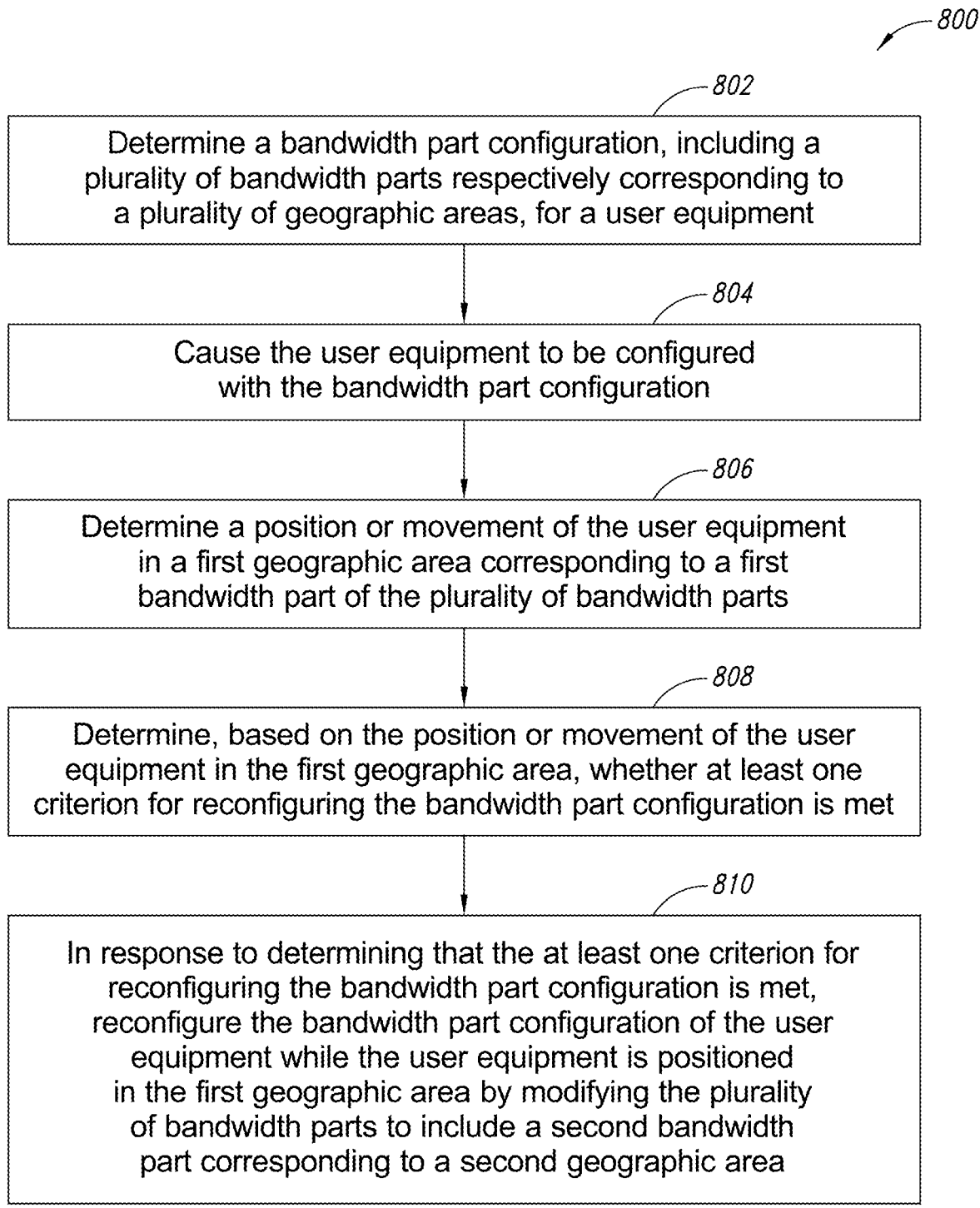
FIG. 8 shows a flow diagram of a method for prediction-based reconfiguration of a bandwidth part configuration of the user equipment.

FIG. 8 shows a flow diagram of a method 800 for prediction-based reconfiguration of the bandwidth part configuration of the user equipment 101. A non-terrestrial network entity, such as the satellite 101 operating as a base station or the processor 128b or controller thereof described with reference to FIG. 5, determines a bandwidth part configuration for a user equipment 802. The bandwidth part configuration includes a plurality of bandwidth parts respectively corresponding to a plurality of geographic areas. The non-terrestrial network entity causes the user equipment to be configured with the bandwidth part configuration at 804.

At 806, the non-terrestrial network entity determines a position or movement of the user equipment in a first geographic area of the plurality of geographic areas. The user equipment uses a first bandwidth part of the plurality of bandwidth parts corresponding to the first geographic area while the user equipment is located in the first geographic area. The user equipment receives downlink data or transmits uplink data over the first bandwidth part.

At 808, the non-terrestrial network entity determines, based on the position or movement of the user equipment in the first geographic area, whether at least one criterion for reconfiguring the bandwidth part configuration is met. As described herein, the non-terrestrial network entity may determine whether the user equipment is at an edge of the first geographic area and may soon transition to a second geographic area whose bandwidth part is not among the plurality of bandwidth parts included in the bandwidth part configuration for the user equipment. Accordingly, the at least one criterion for reconfiguring the bandwidth part configuration is met.

In response to determining that the at least one criterion for reconfiguring the bandwidth part configuration is met, the non-terrestrial network entity at 810 reconfigures the bandwidth part configuration of the user equipment. The non-terrestrial network entity reconfigures the bandwidth part configuration while the user equipment is positioned in the first geographic area and before the user equipment moves to the second geographic area. Reconfiguring the bandwidth part configuration of the user equipment may include modifying the plurality of bandwidth parts to include a second bandwidth part corresponding to the second geographic area. The non-terrestrial network entity then transmits the reconfiguration of the bandwidth part configuration to the user equipment. For example, the satellite 101 operating as a base station may utilize the transmitter 122b described with reference to FIG. 5 to transmit the reconfiguration of the bandwidth part configuration to the user equipment.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A non-terrestrial network entity, comprising:
   a controller configured to:
   determine a bandwidth part configuration for a user equipment, the bandwidth part configuration including a plurality of bandwidth parts respectively corresponding to a plurality of geographic areas;
cause the user equipment to be configured with the bandwidth part configuration;
determine a position or movement of the user equipment in a first geographic area of the plurality of geographic areas, the first geographic area corresponding to a first bandwidth part of the plurality of bandwidth parts;
determine, based on the position or movement of the user equipment in the first geographic area, whether at least one criterion for reconfiguring the bandwidth part configuration is met; and
in response to determining that the at least one criterion for reconfiguring the bandwidth part configuration is met, reconfigure the bandwidth part configuration of the user equipment while the user equipment is positioned in the first geographic area, reconfiguring the bandwidth part configuration of the user equipment including:
modifying the plurality of bandwidth parts to include a second bandwidth part corresponding to a second geographic area; and
a transmitter configured to transmit the bandwidth part configuration and the reconfiguration of the bandwidth part configuration to the user equipment,
wherein the controller is configured to reconfigure the bandwidth part configuration of the user equipment by at least modifying the plurality of bandwidth parts to remove a third bandwidth part of the plurality of bandwidth parts, and
wherein the controller is configured to remove the third bandwidth part of the plurality of bandwidth parts by at least determining that, of the plurality of geographic areas included in the bandwidth part configuration, the position of the user equipment is farthest from a boundary of a third geographic area corresponding to the third bandwidth part.

2. The non-terrestrial network entity according to claim 1, wherein determining whether the at least one criterion for reconfiguring the bandwidth part configuration is met includes:
determining whether a first distance from the position of the user equipment in the first geographic area to a boundary of the second geographic area is less than a first threshold; and
determining that the at least one criterion for reconfiguring the bandwidth part configuration is met in response to determining that the first distance from the position of the user equipment in the first geographic area to the boundary of the second geographic area is less than the first threshold.

3. The non-terrestrial network entity according to claim 1, wherein determining whether the at least one criterion for reconfiguring the bandwidth part configuration is met includes:
determining whether a second distance from the position of the user equipment in the first geographic area to a boundary of the first geographic area is less than a second threshold; and
determining that the at least one criterion for reconfiguring the bandwidth part configuration is met in response to determining that the second distance from the position of the user equipment in the first geographic area to the boundary of the first geographic area is less than the second threshold.

4. The non-terrestrial network entity according to claim 1, wherein the first and second geographic areas are adjacent.

5. The non-terrestrial network entity according to claim 1, wherein the controller is configured to:
reconfigure the bandwidth part configuration of the user equipment while the user equipment is positioned in the first geographic area using radio resource control (RRC) signaling.

6. The non-terrestrial network entity according to claim 5, wherein the controller is configured to:
determine to switch an active bandwidth part of the user equipment from the first bandwidth part to the second bandwidth part; and
send a command to the user equipment to switch the active bandwidth part using downlink control information (DCI).

7. The non-terrestrial network entity according to claim 1, wherein the controller is configured to remove the third bandwidth part of the plurality of bandwidth parts by at least:
determining that, of the plurality of geographic areas included in the bandwidth part configuration, the user equipment spends a least amount of time, sends a least amount of uplink data or receives a least amount of downlink data in the third geographic area corresponding to the third bandwidth part.

8. A method, comprising:
determining a bandwidth part configuration for a user equipment, the bandwidth part configuration including a plurality of bandwidth parts respectively corresponding to a plurality of geographic areas;
configuring the user equipment with the bandwidth part configuration;
determining a position or movement of the user equipment in a first geographic area of the plurality of geographic areas, the first geographic area corresponding to a first bandwidth part of the plurality of bandwidth parts;
determining, based on the position or movement of the user equipment in the first geographic area, whether at least one criterion for reconfiguring the bandwidth part configuration is met; and
in response to determining that the at least one criterion for reconfiguring the bandwidth part configuration is met, reconfiguring the bandwidth part configuration of the user equipment while the user equipment is positioned in the first geographic area, reconfiguring the bandwidth part configuration of the user equipment including:
modifying the plurality of bandwidth parts to include a second bandwidth part corresponding to a second geographic area,
wherein reconfiguring the bandwidth part configuration of the user equipment includes at least modifying the plurality of bandwidth parts to remove a third bandwidth part of the plurality of bandwidth parts, and
wherein removing the third bandwidth part of the plurality of bandwidth parts includes at least determining that, of the plurality of geographic areas included in the bandwidth part configuration, the position of the user equipment is farthest from a boundary of a third geographic area corresponding to the third bandwidth part.

9. The method according to claim 8, wherein determining whether the at least one criterion for reconfiguring the bandwidth part configuration is met includes:

determining whether a first distance from the position of the user equipment in the first geographic area to a boundary of the second geographic area is less than a first threshold; and determining that the at least one criterion for reconfiguring the bandwidth part configuration is met in response to determining that the first distance from the position of the user equipment in the first geographic area to the boundary of the second geographic area is less than the first threshold.

10. The method according to claim 8, wherein determining whether the at least one criterion for reconfiguring the bandwidth part configuration is met includes:

determining whether a second distance from the position of the user equipment in the first geographic area to a boundary of the first geographic area is less than a second threshold; and determining that the at least one criterion for reconfiguring the bandwidth part configuration is met in response to determining that the second distance from the position of the user equipment in the first geographic area to the boundary of the first geographic area is less than the second threshold.

11. The method according to claim 8, wherein the first and second geographic areas are adjacent.

12. The method according to claim 8, comprising:

reconfiguring the bandwidth part configuration of the user equipment while the user equipment is positioned in the first geographic area using radio resource control (RRC) signaling.

13. The method according to claim 12, comprising:

determining to switch an active bandwidth part of the user equipment from the first bandwidth part to the second bandwidth part; and sending a command to the user equipment to switch the active bandwidth part using downlink control information (DCI).

14. The method according to claim 8, wherein removing the third bandwidth part of the plurality of bandwidth parts includes at least:

determining that, of the plurality of geographic areas included in the bandwidth part configuration, the user equipment spends a least amount of time, sends a least amount of uplink data or receives a least amount of downlink data in the a third geographic area corresponding to the third bandwidth part.

15. A non-terrestrial network entity, comprising:

a controller configured to:

determine a bandwidth part configuration for a user equipment, the bandwidth part configuration including a plurality of bandwidth parts respectively corresponding to a plurality of geographic areas;

cause the user equipment to be configured with the bandwidth part configuration;

determine a position or movement of the user equipment in a first geographic area of the plurality of geographic areas, the first geographic area corresponding to a first bandwidth part of the plurality of bandwidth parts;

determine, based on the position or movement of the user equipment in the first geographic area, whether at least one criterion for reconfiguring the bandwidth part configuration is met; and in response to determining that the at least one criterion for reconfiguring the bandwidth part configuration is met, reconfigure the bandwidth part configuration of the user equipment while the user equipment is positioned in the first geographic area, reconfiguring the bandwidth part configuration of the user equipment including:

modifying the plurality of bandwidth parts to include a second bandwidth part corresponding to a second geographic area; and a transmitter configured to transmit the bandwidth part configuration and the reconfiguration of the bandwidth part configuration to the user equipment, wherein the controller is configured to reconfigure the bandwidth part configuration of the user equipment by at least modifying the plurality of bandwidth parts to remove a third bandwidth part of the plurality of bandwidth parts, and wherein the controller is configured to remove the third bandwidth part of the plurality of bandwidth parts by at least determining that, of the plurality of geographic areas included in the bandwidth part configuration, the user equipment spends a least amount of time, sends a least amount of uplink data or receives a least amount of downlink data in a third geographic area corresponding to the third bandwidth part.

16. The non-terrestrial network entity according to claim 15, wherein determining whether the at least one criterion for reconfiguring the bandwidth part configuration is met includes:

determining whether a first distance from the position of the user equipment in the first geographic area to a boundary of the second geographic area is less than a first threshold; and determining that the at least one criterion for reconfiguring the bandwidth part configuration is met in response to determining that the first distance from the position of the user equipment in the first geographic area to the boundary of the second geographic area is less than the first threshold.

17. The non-terrestrial network entity according to claim 15, wherein determining whether the at least one criterion for reconfiguring the bandwidth part configuration is met includes:

determining whether a second distance from the position of the user equipment in the first geographic area to a boundary of the first geographic area is less than a second threshold; and determining that the at least one criterion for reconfiguring the bandwidth part configuration is met in response to determining that the second distance from the position of the user equipment in the first geographic area to the boundary of the first geographic area is less than the second threshold.

18. A method, comprising:

determining a bandwidth part configuration for a user equipment, the bandwidth part configuration including a plurality of bandwidth parts respectively corresponding to a plurality of geographic areas;

configuring the user equipment with the bandwidth part configuration;

determining a position or movement of the user equipment in a first geographic area of the plurality of geographic areas, the first geographic area corresponding to a first bandwidth part of the plurality of bandwidth parts;

determining, based on the position or movement of the user equipment in the first geographic area, whether at least one criterion for reconfiguring the bandwidth part configuration is met; and in response to determining that the at least one criterion for reconfiguring the bandwidth part configuration is met, reconfiguring the bandwidth part configuration of the user equipment while the user equipment is positioned in the first geographic area, reconfiguring the bandwidth part configuration of the user equipment including:
modifying the plurality of bandwidth parts to include a second bandwidth part corresponding to a second geographic area,
wherein reconfiguring the bandwidth part configuration of the user equipment includes at least modifying the plurality of bandwidth parts to remove a third bandwidth part of the plurality of bandwidth parts, and
wherein removing the third bandwidth part of the plurality of bandwidth parts includes at least determining that, of the plurality of geographic areas included in the bandwidth part configuration, the user equipment spends a least amount of time, sends a least amount of uplink data or receives a least amount of downlink data in a third geographic area corresponding to the third bandwidth part.

19. The method according to claim 18, wherein determining whether the at least one criterion for reconfiguring the bandwidth part configuration is met includes:

determining whether a first distance from the position of the user equipment in the first geographic area to a boundary of the second geographic area is less than a first threshold; and
determining that the at least one criterion for reconfiguring the bandwidth part configuration is met in response to determining that the first distance from the position of the user equipment in the first geographic area to the boundary of the second geographic area is less than the first threshold.

20. The method according to claim 18, wherein determining whether the at least one criterion for reconfiguring the bandwidth part configuration is met includes:
determining whether a second distance from the position of the user equipment in the first geographic area to a boundary of the first geographic area is less than a second threshold; and
determining that the at least one criterion for reconfiguring the bandwidth part configuration is met in response to determining that the second distance from the position of the user equipment in the first geographic area to the boundary of the first geographic area is less than the second threshold.

* * * * *